(12) United States Patent
Corghi

(10) Patent No.: US 6,842,238 B2
(45) Date of Patent: Jan. 11, 2005

(54) DEVICE FOR MEASURING THE PARAMETERS OF A VEHICLE CHARACTERISTIC ATTITUDE

(75) Inventor: Remo Corghi, Correggio (IT)

(73) Assignee: Corghi S.p.A., Correggio (IT)

(*) Notice: Subject to any disclaimer, the term of this patent is extended or adjusted under 35 U.S.C. 154(b) by 0 days.

(21) Appl. No.: 10/355,192

(22) Filed: Jan. 31, 2003

(65) Prior Publication Data

US 2003/0147068 A1 Aug. 7, 2003

(30) Foreign Application Priority Data

Feb. 4, 2002 (EP) ............................................ 02425053

(51) Int. Cl.$^7$ ........................... G01B 11/26; G01B 13/18
(52) U.S. Cl. ................................ 356/139.09; 33/203.18
(58) Field of Search ........................... 356/139, 139.09; 33/203.18

(56) References Cited

U.S. PATENT DOCUMENTS 6,690,456 B2 * 2/2004 Bux et al. .............. 356/139.09
2002/0027651 A1 * 3/2002 Jackson et al.

FOREIGN PATENT DOCUMENTS

| DE | 29 48 573 | 3/1979 |
|---|---|---|
| EP | 1 003 013 | 5/2000 |
| FR | 2 764 992 | 12/1999 |
| WO | WO 94/05969 | 3/1994 |
| WO | WO 97/14016 | 4/1997 |
| WO | WO 00/16121 | 3/2000 |
| WO | WO 01/71280 | 9/2001 |

* cited by examiner

Primary Examiner—Thomas H. Tarcza
Assistant Examiner—Isam Alsomiri
(74) Attorney, Agent, or Firm—Browdy and Neimark, P.L.L.C.

(57) ABSTRACT

A system for measuring the characteristic attitude parameters of a vehicle, comprising at least one video camera arranged to monitor at least one image of a target rigid with at least one wheel of the vehicle, and means for processing the acquired image of the target to define the orientation of the target relative to a reference system, comprises a measurement site; a measurement unit fixed to each of the sides of said site and comprising at least one video camera orientated towards any one target fixed with any orientation to a wheel positioned on the same side; a third video camera associated with the unit fixed to one of the sides of the site and orientated towards the unit fixed on the other side of the site; any one target rigid with the unit fixed to the other side of the site and positioned within the field of vision of the third video camera; each video camera being arranged to acquire at least two images of the respective target from at least two different positions; processor means for the images acquired by the three video cameras to define the spatial position of the targets with respect to a single reference system; display means which display the data provided by said processor means.

5 Claims, 3 Drawing Sheets

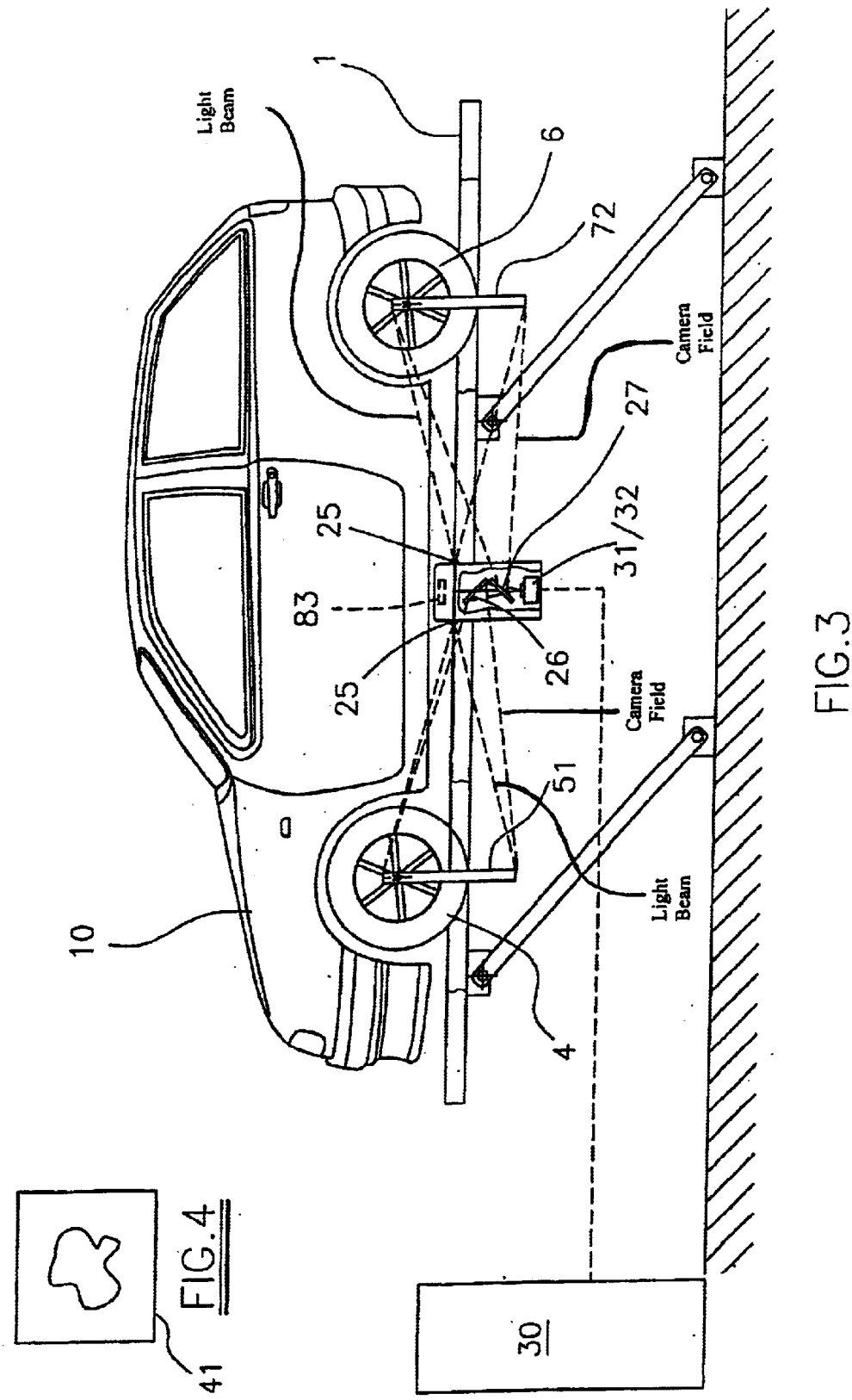

DEVICE FOR MEASURING THE PARAMETERS OF A VEHICLE CHARACTERISTIC ATTITUDE

BACKGROUND OF THE INVENTION

This patent relates to a device for measuring the characteristic attitude parameters of a vehicle.

Devices of mechanical type and of optical type are known for measuring said parameters.

Optical devices are known using video cameras positioned in a fixed position with respect to the measurement site on which the vehicle to be checked is located.

Said video cameras monitor a series of targets or locators of known dimensions, each rigid with one of the wheels, and feed the data to a processor which processes the obtained data by means of known trigonometric formulas, to provide on a screen, and possibly by means of a printer, the characteristic attitude parameters of the vehicle, specifically:

left and right front semi-convergence
front total convergence
left and right rear semi-convergence
rear total convergence
right and left front camber
right and left rear camber
right and left incidence
right and left kingpin
front and rear set-back
thrust angle
track difference The text will be better understood from the following definitions of the characteristic angles:

semi-convergence: the angle formed between the plane perpendicular to the axis of each wheel and the longitudinal axis of symmetry of the vehicle;

total convergence: the angle resulting from the sum of the angles of semi-convergence of the wheels pertaining to one and the same axle;

camber: the angle formed between the plane perpendicular to the axis of each wheel and the vertical plane;

incidence: the angle between the projection of the steering axis onto the vehicle longitudinal plane and the vertical;

kingpin: the angle formed between the projection of the steering axis onto the vehicle transverse plane and the vertical;

set-back: the misalignment between the wheels of one and the same axle and the vehicle axis of symmetry;

thrust axis: the axis between the bisector of the total rear convergence angle and the vehicle axis of symmetry;

track difference: the angle between the line joining the wheels positioned on one and the same side, but pertaining to two different axles, and the vehicle axis of symmetry.

The targets used by said system comprise, in one plane, geometrical patterns formed for example from successions of points, such as point grids, in which the points can be opaque or luminous The pattern support surfaces and the patterns themselves are known and of known dimensions, and are mounted rigid with the wheels of the vehicles to be examined. A comparison between the known geometrical dimensions and the images received by the video cameras forms the basis for the processing which results in the calculation of the spatial position of the target/wheel.

A system is also known, illustrated in German publication DE 2948573. It comprises a pair of video cameras on each side of the vehicle, each pair being able to be swivelled in order to view the front and rear vehicle wheels alternately.

The video cameras read a target rigid with the wheel, this being the wheel rim edge.

By comparing the images, substantially in the form of ellipses having geometrical characteristics proportional to the wheel inclination, with the reference circle consisting of the wheel rim edge, or by interpolating the images, the characteristic attitude parameters can be determined.

Another known system is illustrated in the documents WO94/05969 and WO97/14016, and comprises a fixed measurement site presenting a frontal rigid bar on which two fixed video cameras are positioned at a predetermined distance apart and are aimed at targets rigid with the vehicle right and left wheels.

By comparing the images acquired by the video cameras with the target sample images, the characteristic attitude parameters can be calculated using known trigonometric calculations.

A system is also known, described in WO01/71280, which uses two alignment video cameras acquiring images of alignment targets of known shape and dimensions fixed to the vehicle front and rear wheels, and a calibration video camera rigid with one of the alignment video cameras to acquire the image of a calibration target of known dimensions rigid with the other alignment video camera.

All the known systems have a common drawback which greatly limits their use, namely the need to use targets of known shape and dimensions.

These targets constitute the sample image with which the known systems compare the target image acquired by the alignment video cameras when the target is fixed to the respective wheel.

It is evident that the known target image must be stored in the memory of the processor which calculates the position of the other targets available to the comparison means, and hence of the wheels.

The said drawback is of considerable importance because it is sufficient for just one of the targets to undergo slight damage, with modification of its image, to render the system inefficient.

Moreover, once the sample image of the known target has been fed into the processor memory, it is not possible to use different targets, even if of known shape and dimensions, without modifying the processor memory data.

SUMMARY OF THE INVENTION

The object of the present patent is to provide a measurement system which is free of or substantially eliminates said drawback.

Said object is attained according to the invention by virtue of the characteristics defined in the claims.

Specifically, said object is attained by a device comprising a measurement site; a measurement unit fixed to each of the sides of said site and comprising at least one video camera orientated towards any one target fixed with any orientation to a wheel positioned on the same side of the site; means to enable each measurement unit to undergo limited but measurable movements; a third video camera associated with the unit fixed to one of the sides of the site and orientated towards the unit fixed on the other side of the site; any one target rigid with the unit fixed to the other side of the site and positioned within the field of vision of the third video camera; each video camera being arranged to acquire at least two images of the respective target from at least two different positions; processor means for the images acquired by the three video cameras to define the spatial position of the targets with respect to a single reference system; and display means which display the data provided by said processor means.

BRIEF DESCRIPTION OF THE DRAWING

The merits and the operational and constructional characteristics of the invention will be apparent from the ensuing detailed description relative to a preferred embodiment thereof illustrated in the figures of the accompanying drawings, in which:

FIG. 3 shows an executive variant thereof.

FIG. 4 shows a target image suitable for use in the invention.

DETAILED DESCRIPTION OF THE DRAWING

Figure 1:
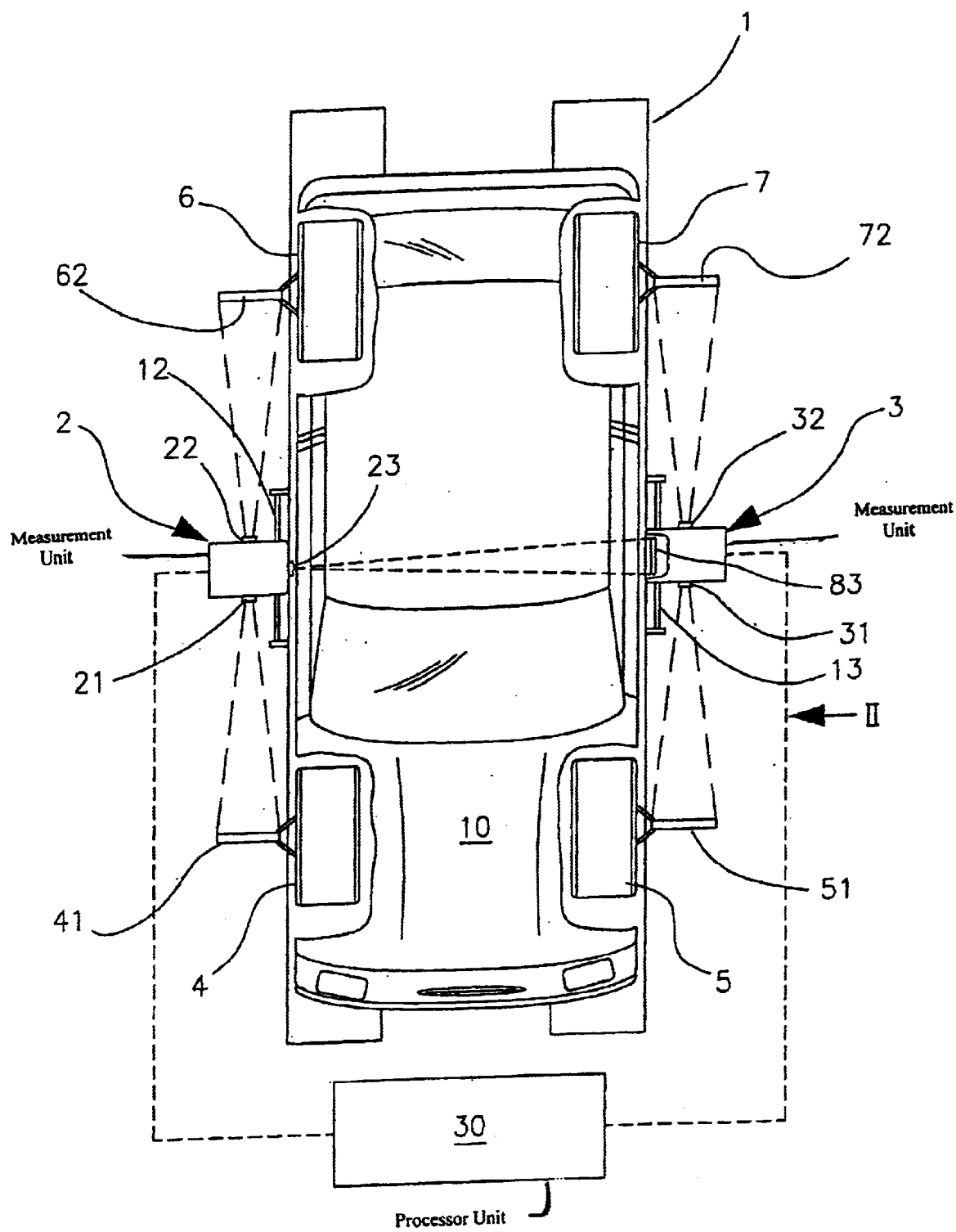
FIG. 1 schematically illustrates the invention.
Figure 2:
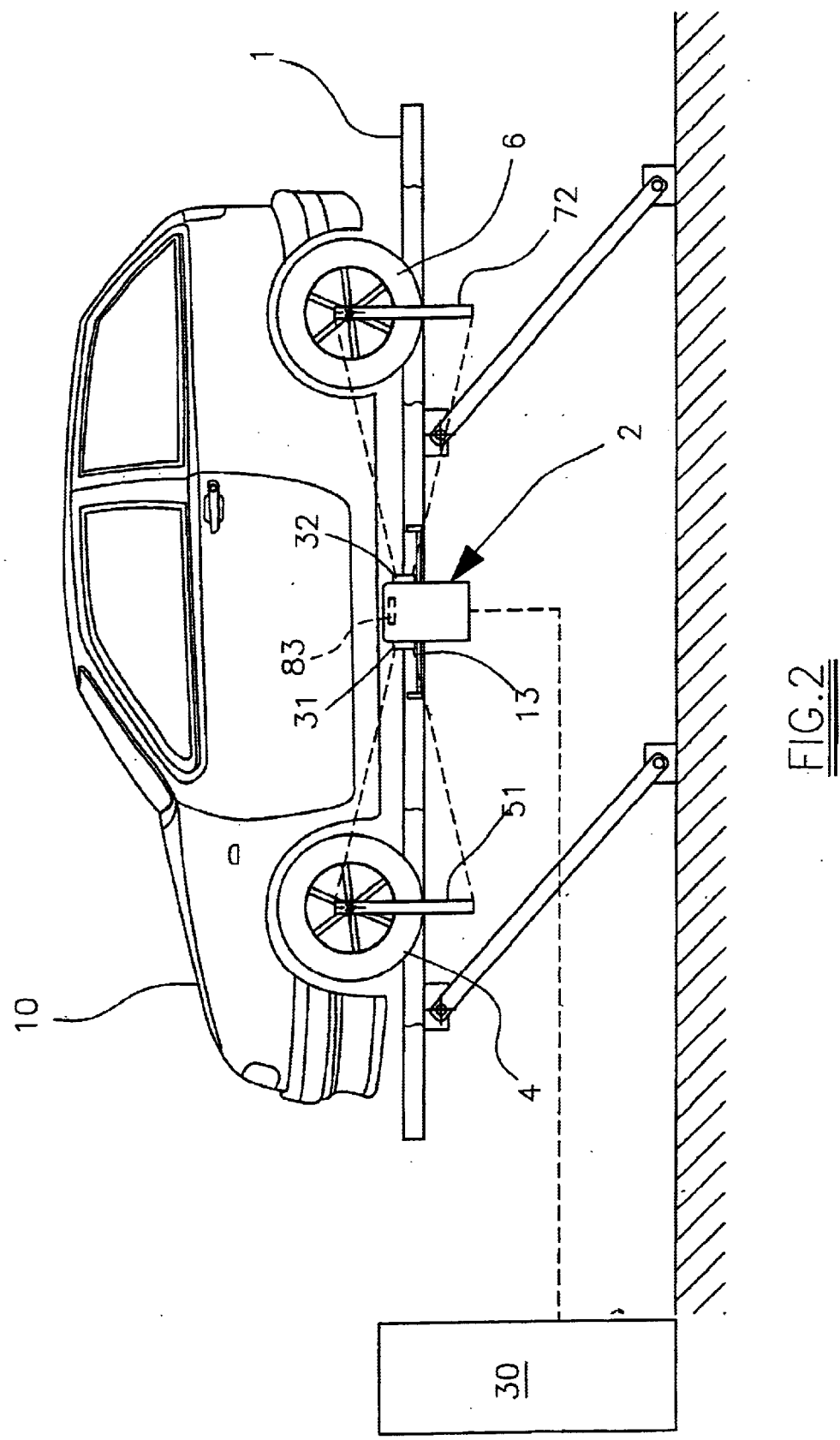
FIG. 2 is a view in the direction 11 of FIG. 1.

FIG. 1 is a plan view of the invention, showing the vehicle lift 1 on which a vehicle 10 is positioned.

The vehicle lift 1 carries, fixed on one side, a unit 2 composed of three video cameras (21, 22 and 23 respectively) and, fixed on the other side, a unit 3 composed of two video cameras (31 and 32 respectively) and a target 83, the only requirement of which is that it has a defined contour.

Each of said units 2 and 3 is fixed to the vehicle lift by means, 12 and 13 respectively, which enable it to undergo a movement of measurable extent.

The means 12 and 13 shown in the figures are simple slide rails of any orientation.

The video cameras 21 and 31 are orientated towards the targets 41 and 51 associated with the front wheels 4 and 5 of the vehicle, the video cameras 22 and 32 being likewise orientated towards the targets 62 and 72 of the rear wheels 6 and 7 of the vehicle 10.

The only requirement of the targets 41, 51, 62 and 72 is again that they have a defined contour, which can be different from each other.

Said targets 41, 51, 62, 72 are fixed to the respective vehicle wheels by known means, not shown.

By using run-out compensation, an operation well known to the expert of the art, a relationship between the target and the wheel axis can be determined.

The video camera 23 is orientated towards the target 83 which is rigid with the video camera unit 3.

The images acquired by the video cameras are fed to a processor unit 30, which also comprises means for displaying the results of the measurements and means for printing them out.

FIG. 3 shows an executive variant of the invention, which differs from the first described embodiment in respect of the video camera units 2 and 3.

In the description of this second embodiment of the invention, the same reference numerals are used for components identical to those already described in the first embodiment of the invention.

According to said variant, the video cameras 21, 22 and 31, 32 are replaced by a single video camera 21/22 and 31/32 and by an arrangement of translucent mirrors 26 and 27.

Each of the two units 2 and 3 comprises LEDs 25 which project a light beam in the direction of the targets 41, 51, 62 and 72 framed by the video cameras.

With reference to FIG. 3, the mirror 26 of each unit reflects the light originating from the target 41 and respectively 51 in the direction of the video cameras 21/22 and 31/32, whereas the translucent mirror 27 partially reflects the light originating from the target 62 and respectively 72 in the direction of the video cameras 21/22 and 31/32.

The images originating from one target can be distinguished from the images originating from the other target by activating the LEDs, to illuminate the targets at regular time intervals in succession.

By virtue of the ability to move each video camera unit, each video camera receives at least two images of the same target from different positions, the processing of the images received by the video cameras enabling the precise position of each target in space to be identified.

The calibration video camera 23 and the calibration target 83 enable the precise relative spatial position of the targets located on the wheels to be calculated, and hence the characteristic attitude angles.

The units 2 and 3 are firmly fixed, but without particular care with regard to their positioning.

In the example illustrated in FIG. 1, the unit 2 contains the video cameras 21, 22 and 23, whereas the unit 3 contains the video cameras 31, 32 and the target 83.

The purpose of the video camera 23 is to close the reference basis for the system formed by the other four video cameras, and in the final analysis to correlate the spatial position of the targets 41, 51, 62 and 72 with respect to a single reference system.

The two images of the target 83 acquired by the video camera 23 are fed to the processor and processed thereby to give an indication of the position of one video camera unit relative to the other in order to attribute to all the video cameras the same spatial reference system.

The units 2 and 3 can occupy any mutual position, provided the targets are visible to the respective video cameras.

In the illustrated example the invention therefore comprises two video camera units 2 and 3, mounted directly above the runways of a normal vehicle lift intended to receive the vehicle for verifying the attitude of the wheels, a series of four targets (41, 51, 62 and 72) to be applied to the wheels, and a processor, display and printing unit (30).

The fundamental difference between the invention and the known art lies in the fact that the targets are of any shape and dimensions, provided they comprise a defined, open or closed contour.

A normal vehicle lift can be used as the measurement site, this being quickly equipped without particular precision requirements in the positioning of the video cameras, to provide:

a field of measurement covering all working levels of the vehicle lift;

precise measurements without the need for mechanical precision structures connected to the working site.

Finally, it should be noted that the video camera 23 can read the target of the opposite unit through the space existing below the vehicle.

What is claimed is:

1. A system for measuring the characteristic attitude parameters of a vehicle, comprising:

a measurement site having two opposite sides, each side being associated with a respective pair of vehicle wheels;

two measurement units each mounted to a respective one of the two opposite sides of said measurement site and each comprising at least one video camera oriented towards a target fixed with any orientation to a wheel positioned on the same side of said measurement site as the respective measurement unit;

a second video camera forming part of one of said measurement units and having a field of view oriented towards a further target associated with the other one of said measurement units;

processor means for the images acquired by said at least one video camera of each of said measurement units and said second video camera to define the spatial position of the targets with respect to a single reference system; and display means which display the data provided by said processor means, wherein each of said video cameras is movable relative to said measurement site to acquire at least two images of a respective target from at least two different positions.

2. The system of claim 1, wherein said measurement site is constituted by a vehicle lift to which said measurement units are fixed.

3. The system of claim 2, wherein the vehicle whose characteristic attitude parameters are to be measures is an automobile having left front and rear wheels associated with one of said measuring units and right front and rear wheels associated with the other one of said measuring units, and said at least one video camera of each of said measurement units comprises two video cameras, one of which is oriented toward a target fixed to the front wheel associated with the same measurement unit and the other of which is oriented towards a target fixed to the rear wheel associated with the same measurement unit.

4. The system of claim 1, further comprising means for producing measurable movements of each of said measurement units.

5. The system of claim 1, further comprising intermittently operated means for illuminating at least one target.

* * * * *